US007107576B2

(12) United States Patent
Takahashi et al.

(10) Patent No.: US 7,107,576 B2
(45) Date of Patent: Sep. 12, 2006

(54) METHOD FOR ASSOCIATING NAMES AND DEVICE FOR THE SAME IN ENTERPRISE APPLICATIONS

(75) Inventors: Kenta Takahashi, Yokohama (JP); Yuji Yamamoto, Yokohama (JP); Nobuyuki Yamamoto, Yokohama (JP); Kousuke Shindou, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 691 days.

(21) Appl. No.: 10/301,542

(22) Filed: Nov. 20, 2002

(65) Prior Publication Data

US 2003/0101435 A1 May 29, 2003

(30) Foreign Application Priority Data

Nov. 29, 2001 (JP) ............................ 2001-363567

(51) Int. Cl.
*G06F 9/44* (2006.01)
*G06F 9/445* (2006.01)

(52) U.S. Cl. ....................... 717/120; 717/172; 717/177

(58) Field of Classification Search ................ 717/120, 717/168–178

See application file for complete search history.

(56) References Cited

U.S. PATENT DOCUMENTS

| | | | | |
|---|---|---|---|---|
| 6,665,861 | B1 * | 12/2003 | Francis et al. | 717/120 |
| 6,751,797 | B1 * | 6/2004 | Desgranges et al. | 719/315 |
| 6,918,112 | B1 * | 7/2005 | Bourke-Dunphy et al. | 717/177 |

FOREIGN PATENT DOCUMENTS

JP 10-069379 3/1998

OTHER PUBLICATIONS

Sun Microsystems, Inc., “Enterprise Java Beans™Specification, V1.1 Final Release,” (Dec. 1999) pp: 1-14.
Sun Microsystems, Inc., “EJB Architecture Roles and Scenarios,” (Nov. 1999) Chapter 3: pp. 21-28.
Sun Microsystems, Inc., “Security Management,” (Nov. 1999) Chapter 15: pp. 219-238.
Sun Microsystems, Inc., “Java™Plafrom Enterprise Edition Specification, V1.2,” (Dec. 1999).
Sun Microsystems, Inc., “Platform Overview,” (Dec. 1999) Chapter 2: pp. 2-1 to 2-14.
Sun Microsystems, Inc., “Application Assembly and Deployment,” (Dec. 1999) Chapter 8: pp. 8-1 to 8-14.
Sun Microsystems, Inc., “Application Clients,” (Dec. 1999) Chapter 9: pp. 9-1 to 9-14.

* cited by examiner

*Primary Examiner*—Wei Zhen
*Assistant Examiner*—Philip Wang
(74) *Attorney, Agent, or Firm*—Townsend and Townsend and Crew LLP

(57) ABSTRACT

A method of associating two components in an object-oriented includes generating a component information management table. A first component refers to a second component deployed in a component execution module, the first component including component information on the second component. The management table includes the component information and a physical component name of the second component. The component information includes an external interface name and description of the second component. The physical component name of the second component is retrieved from the component information management table using the component information stored in the first component. The physical component name of the second component obtained from the retrieving step is associated with a logical component name stored in the first component.

13 Claims, 14 Drawing Sheets

EJB component information (317)

| EJB component type (411) | EJB component home name (421) | EJB component interface name (431) |
|---|---|---|
| Session (461) | CartHome (463) | Cart (465) |

451

EJB component information (317)

| EJB component type (411) | EJB component home name (421) | EJB component interface name (431) | EJB component description (471) |
|---|---|---|---|
| Session (461) | CartHome (463) | Cart (465) | ShoppingBean uses this bean as a shopping cart. (467) |

481

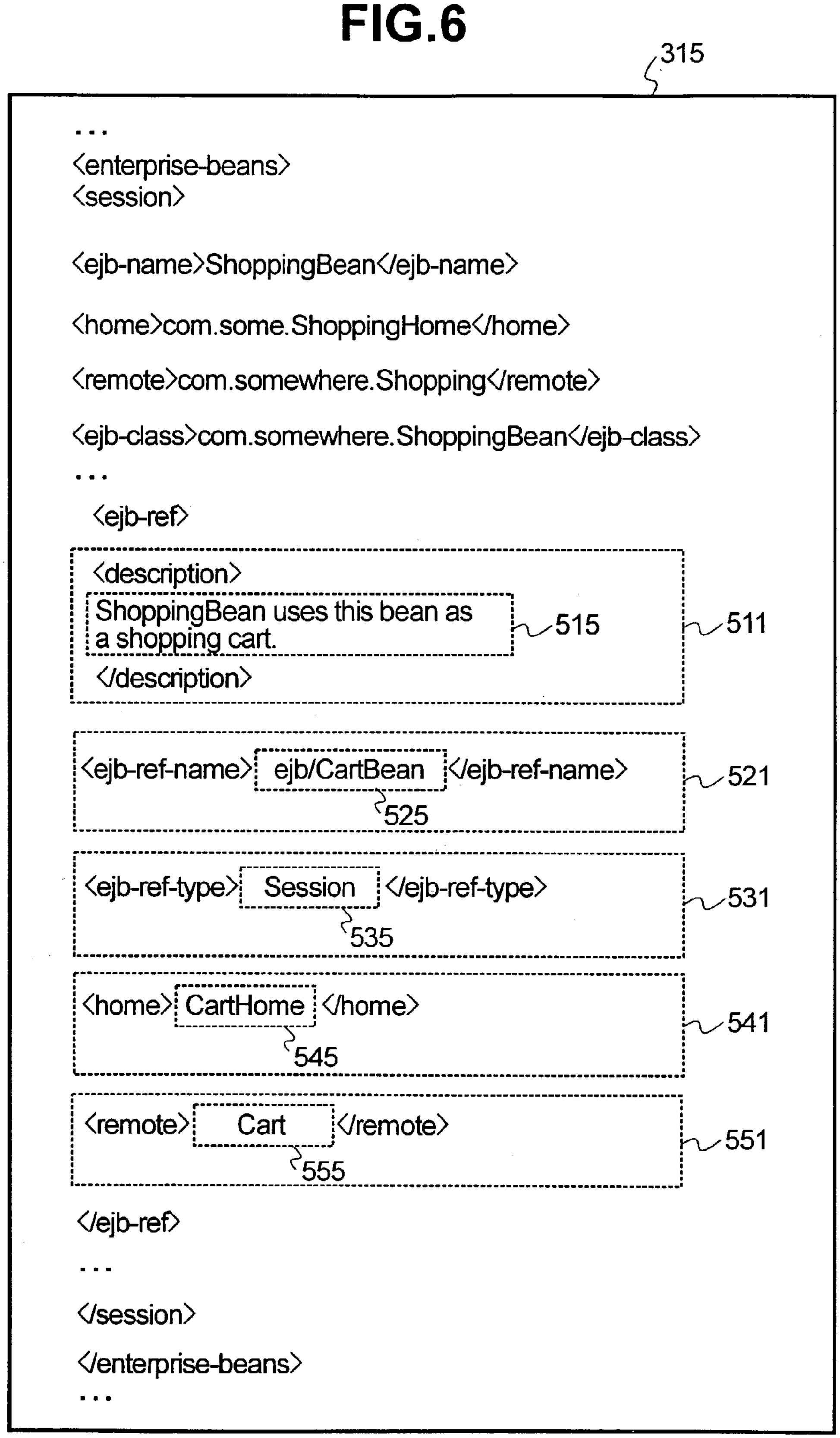

FIG.6

...
<enterprise-beans>
<session>

<ejb-name>ShoppingBean</ejb-name>

<home>com.some.ShoppingHome</home>

<remote>com.somewhere.Shopping</remote>

<ejb-class>com.somewhere.ShoppingBean</ejb-class>
...

<ejb-ref>

<description>
    ShoppingBean uses this bean as a shopping cart.  ~515  ~511
    </description>

<ejb-ref-name> ejb/CartBean </ejb-ref-name>  ~521
                525

<ejb-ref-type> Session </ejb-ref-type>  ~531
              535

<home> CartHome </home>  ~541
          545

<remote> Cart </remote>  ~551
          555

</ejb-ref>
...

</session>

</enterprise-beans>
...

EJB component information management table 411, 421, 431, 331; 642

| EJB component type | EJB component home name | EJB component interface name | physical EJB component name |
|---|---|---|---|
| Session | CartHome | Cart | somewhere/ejb/SFS_CartBean |
| ⋮ | ⋮ | ⋮ | ⋮ |

EJB component information management table 411, 421, 431, 471, 331; 851

| EJB component type | EJB component home name | EJB component interface name | EJB component description | physical EJB component name |
|---|---|---|---|---|
| Session | CartHome | Cart | ShoppingBean uses this bean as a shopping cart. | somewhere/ejb/SFS_CartBean |
| ⋮ | ⋮ | ⋮ | ⋮ | ⋮ |

METHOD FOR ASSOCIATING NAMES AND DEVICE FOR THE SAME IN ENTERPRISE APPLICATIONS

CROSS-REFERENCES TO RELATED APPLICATIONS

The present application is related to and claims priority from Japanese Patent Application No. 2001-363567, filed on Nov. 29, 2001.

BACKGROUND OF THE INVENTION

The present invention relates to a method and device for associating names between two components in an enterprise application.

In order to provide rapid deployment and high profits, there has been a growing demand for rapid development, reduced development costs, and higher quality in enterprise applications. These demands have encouraged improved reusability and portability in enterprise applications, leading to the mainstream acceptance of the component model.

In the component model, task modules are collected into components. Components are deployed to a component execution module, which serves as an execution platform for the component. In deployment, an operator sets up component attributes that are dependent on the component execution module and installs the component in the component execution module.

One example of the component model is described in "Enterprise JavaBeans Specification, v1.1 (1999) from Sun Microsystems Corp. (US). In this example, components referred to as Enterprise Beans (hereinafter referred to as "EJB components") are deployed in EJB Containers serving as the component execution modules.

Another example of the component model is described in "Java 2 Platform, Enterprise Edition Specification, v1.2 (1999)" from Sun Microsystems Corp. (US). This document (hereinafter referred to as, "J2EE") is oriented toward the development of multi-level enterprise applications. Components are grouped within each level, and the grouped components are deployed to component execution modules associated with the components.

In the component model, a component can look up another component in order to establish cooperation between the components. For components to cooperate, during the deployment of the components, an association must be made between a logical component name, stored in the first component, of the second component referred to by the first component and a physical component name, stored in the second component, of the second component. A logical component name is a name that uniquely identifies the component among all other components. A physical component name is a name that uniquely identify the component within a given component execution module.

In the conventional technologies, logical component names are associated with physical component names by having the component deployer look up the component setting information in order to manually associate logical component names with physical component names one by one. The component settings information, which can take the form of a manual, includes a table that associates logical component names with physical component names and a table that associates physical component names with logical component names. Component information includes component types and the names of external interfaces, which are the interfaces used to operate components from outside the component execution module. Component information can also include component descriptions that describe components. The component deployer can use the component descriptions to identify the components.

BRIEF SUMMARY OF THE INVENTION

In the conventional method, the component deployer associates logical component names with physical component names by looking up the component settings information and manually making the name associations. Also, in cases where multiple components refer to multiple components, the same procedure must be used to associate logical component names and physical component names one by one. As a result, a significant burden is placed on the component deployer, leading to a decrease in efficiency in the development of systems that use components.

With the conventional method, the component deployer faces a significant burden in the task of associating logical component names and physical component names. This can lead to a decrease in efficiency in the development of systems that use components. One embodiment of the present invention provides a component deployment method and device that, when a first component refers to a second component, automatically retrieves a physical component name of the second component associated with a logical component name of the first component. Another embodiment of the present invention provides a method and device that uses component descriptions having unique values in the data used for the above retrieval method, and that uniquely associates logical component names with physical component names.

The following is a description of a method for associating names when a first component to be deployed refers to a second component deployed in a component execution module.

According to a first method, a physical component name and component information of the second component is obtained. A component information management table storing a table containing component information and the physical component name of said second component is generated. The following three methods can be used to obtain the component information and the physical component name.

(1) The physical component name and the component information are obtained from the component execution module.

(2) The physical component name is obtained from a naming service. Also, the naming service is queried to obtain an object reference associated with the physical component name. This object reference is then analyzed to obtain a component information address indicating the address for the component information of the second component. Finally, the component information of the second component is obtained from the component information address.

(3) The physical component name is obtained from the naming service. Also, the naming service is queried to obtain an object reference associated with the physical component name. This object reference is used to obtain component metadata attached to the second component by the component execution module. The component metadata includes the component external interface and the component type. Finally, the component information of the second component is obtained from the component metadata.

Once the component information management table is generated, the component information of the second component, stored in the first component, is used as an input source to retrieve the physical component name of the second component from the component information management table.

Finally, the one or more retrieved physical component names are associated with the logical component name referring to the second component and stored in the first component.

According to a second method, the component information stored in the first component and the component information stored in the second component includes a component description storing a value that is unique within the component and having the same external interface name and type.

The component information containing the component description and the physical component name are obtained using the same method described in the first method above, and a component information management table is generated. The component information of the second component stored in the first component is used as the input source to retrieve the physical component name of the second component from the generated component information management table. This is then uniquely associated with the logical component name referring to the second component stored in the first component.

In one embodiment, a device for associating components includes ode for generating a component information management table including component information stored in a component and a physical component name of a second component, the first component referring to the second component, the component information providing information about the second component; code for retrieving the physical component name of the second component from the component information management table using the component information stored in the first component; and code for associating the retrieved physical component name of the second with the logical component name of the first component.

In another embodiment, a computer system configured to deploy a component in an object-oriented environment is disclosed. The system includes a component information management module to generate a component information management table that associates component information provided in a first component and a physical component name of a second component, the first component referring to the second component, the component information provided in the first component providing information about the second component; and a component deployment module to associate a logical component name of the first component with the physical component name of the second component and deploy the first component to a component execution module.

In yet another embodiment, a computer readable medium including instructions for deploying a component in an object-oriented environment is disclosed. The medium includes: code to automatically retrieve a physical name of a second component from a component information management table using component information stored in a first component, the first component referring to the second component, the component information stored in the first component providing information about the second component; and code to associate the retrieved physical name of the second component with a logical name of the first component.

In yet another embodiment, deploying a component in an object-oriented environment includes obtaining component information stored in a first component that refers to a second component deployed in a component execution module, the component information providing information about the second component; automatically retrieving at least one physical name from a component information management table using the component information stored in the first component; and associating the at least one physical name with a logical name of the first component.

In yet another embodiment, a method of deploying a first component that refers to a second component in an object-oriented environment is disclosed. The method includes in the first component with a physical component name of the second component, automatically generating a table that associates component information stored in the first component with a physical component name of the second component, the component information providing information about the second component; and deploying the first component to a component execution module using the physical component name retrieved from the generated table, wherein a logical name of the first component is associated with the physical component name of the second component in the component execution module.

In yet another embodiment of the present invention, a method of associating two components in an object-oriented environment is disclosed, wherein a first component refers to a second component deployed in a component execution module, the first component including component information on the second component. The method includes generating a component information management table, the management table including the component information and a physical component name of the second component, the component information including an external interface name and description of the second component; retrieving the physical component name of the second component from the component information management table using the component information stored in the first component; and associating the physical component name of the second component obtained from the retrieving step with a logical component name stored in the first component.

BRIEF DESCRIPTION OF THE DRAWINGS

FIG. 6 illustrates an EJB deployment descriptor according to one embodiment of the present invention.

FIG. 7 illustrates a structure of an EJB component management table according to one embodiment of the present invention.

FIG. 8 illustrates a structure of an EJB component management table according to another embodiment of the present invention.

DETAILED DESCRIPTION OF THE INVENTION

Figure 1:
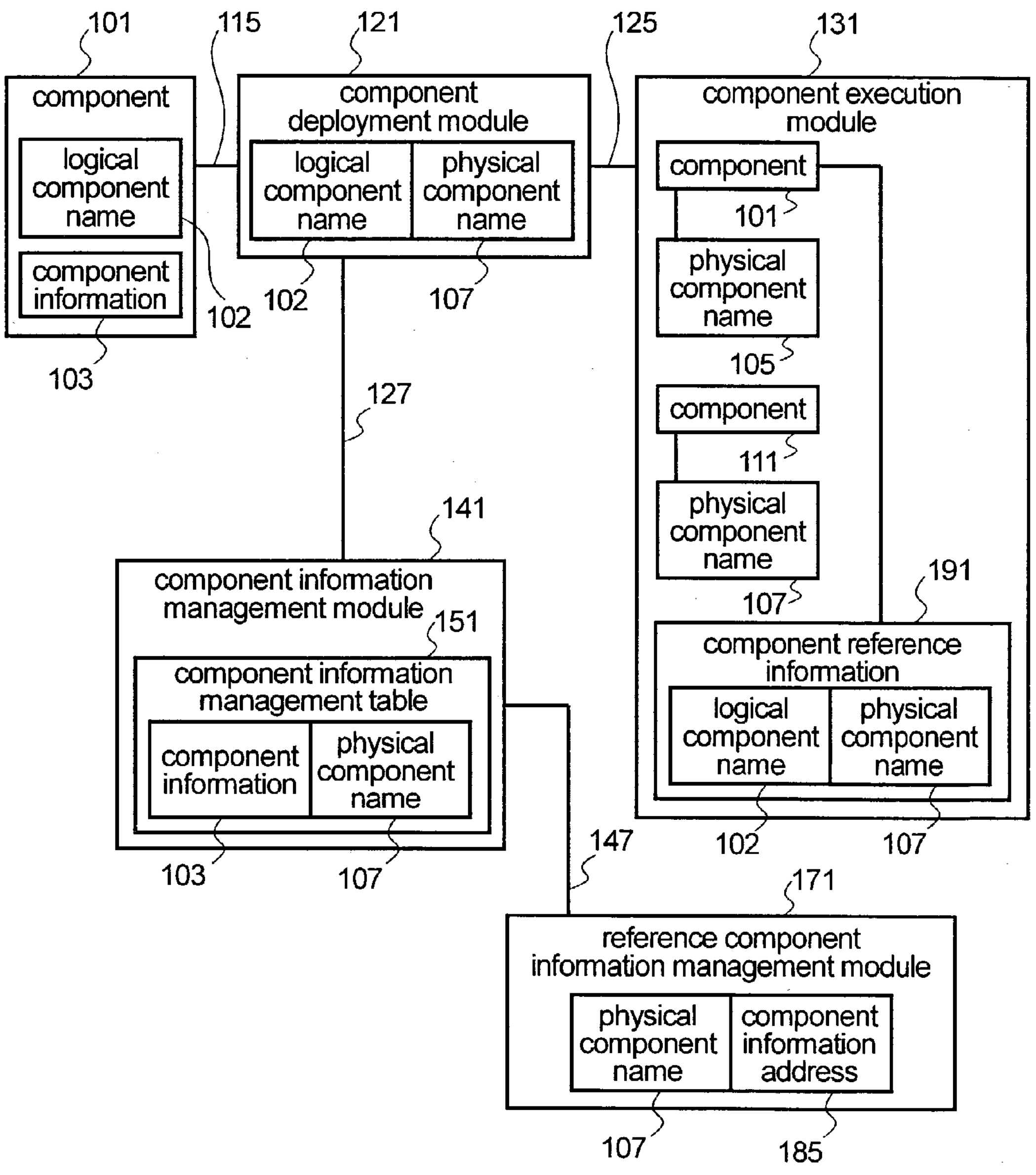
FIG. 1 illustrates components involved in a name association method according to one embodiment of the present invention.

FIG. 1 is a drawing illustrating the principles involved in a name association method according to one embodiment of the present invention. A component 101 includes a logical component name 102 that uniquely identifies the component 101 and component information 103 that includes information about an external interface name and type of a component 111 referred to by the component 101. A component deployment module 121 associates the logical component name 102 with a physical component name 107 that uniquely identifies a component within a component execution module 131. The physical name 107 is obtained from a search 127. The component execution module 131 stores the component 111 deployed by the component deployment module 121 together with the physical component name 107 assigned to the component 111 by the component execution module 131. The component execution module 131 also includes: the component 101 deployed by the component deployment module 121; the physical component name 105 assigned by the component execution module 131; and the component reference information 191, which stores the logical component name 102 and the physical component name 107 associated with the logical component name 102.

A component information management module 141 stores a component information management table 151 containing a table that associates the component information 103 with the physical component name 107 of the component 111 indicated by the component information 103. A reference component information management module 171 stores the physical component name 107 and a component information address 185 used by the component deployment module 121 to indicate to the component execution module 131 the location of the component information containing the external interface name and the type value for the component 111.

The flow of operations performed in the present embodiment is described below. The component deployment module 121 receives the component 101 as an input 115. The component deployment module 121 automatically performs a search 127 of the component information management module 141 using the component information 103 of the component 101 as a key. The physical component name 107 is retrieved. As an extension of the search 127, the component information management module 141 performs automatically a retrieval 147 from the reference component information management module 171 to retrieve the physical component name 107 and the component information address 185. Based on the component information address 185, the component information management table 151 is generated. Next, the component deployment module 121 performs a deployment 125 to the component execution module 131 using as parameters the component 101, the logical component name 102, and the physical component name 107. As an extension of the deployment 125, the component execution module 131 assigns a physical component name 105 to the component 101 and sets up an association between the component 101 and the component reference information 191.

In one embodiment, a human deployer may review the retrieved physical component 107 for its appropriateness prior to its deployment to the execution module 131. If determined appropriate, the deployment 125 is performed as described above. If not, the deployer may initiate another automatic search 127 or retrieve the physical name manually.

As user herein, the term "automatically" or "automatic" describes an act performed, e.g., searching, selecting, or retrieving a particular piece of information, without direct human intervention. A search or retrieval is considered to have been performed "automatically" if at least one decision-making step therein is performed without human intervention. For example, the deployment module 121 uses the component information 103 as a key or parameter in searching for the physical component name 107 upon initiation of the search by a human deployer. In one embodiment, the name association method involves a distributed object-oriented technology.

Figure 2:
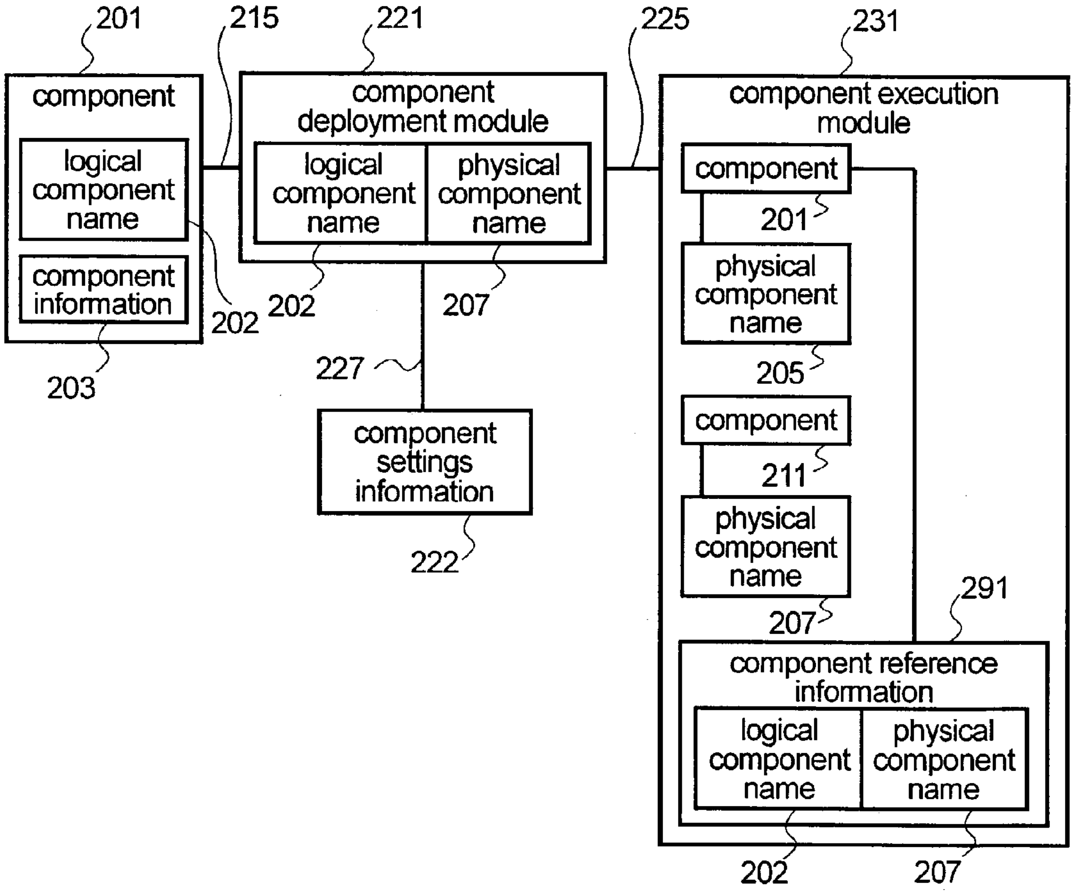
FIG. 2 illustrates how logical component names and physical component names are associated in a conventional technology.

FIG. 2 is a drawing illustrating how logical component names are associated with physical component names according to a conventional technology. A component 201 includes a logical component name 202 and a component information 203. The component information provides information relating to a component 211 that has already been deployed to a component execution module 231 and has been assigned a physical component name 207 by the component execution module 231.

Based on an input 215, a component deployment module 221 retrieves values for the logical component name 202 and the component information 203. Using the component information 203 as a key, a manual search 227 is performed on component settings information 222 to retrieve the physical component name 207 associated with the component information 203. That is, a human deployer searches the setting information 211 for the physical component name. Next, the component deployment module 221 sets up an association between the physical component name 207 retrieved by the manual search 227 and the logical component name 202. Thereafter, in an output operation 225, the component deployment module 221 assigns component information 291, associating the logical component name 202 with the physical component name 207, to the component 201, and the component 201 is output to the component execution module 231. The component execution module 231 then assigns a physical component name 205 to the component 201 and performs deployment.

Figure 3:
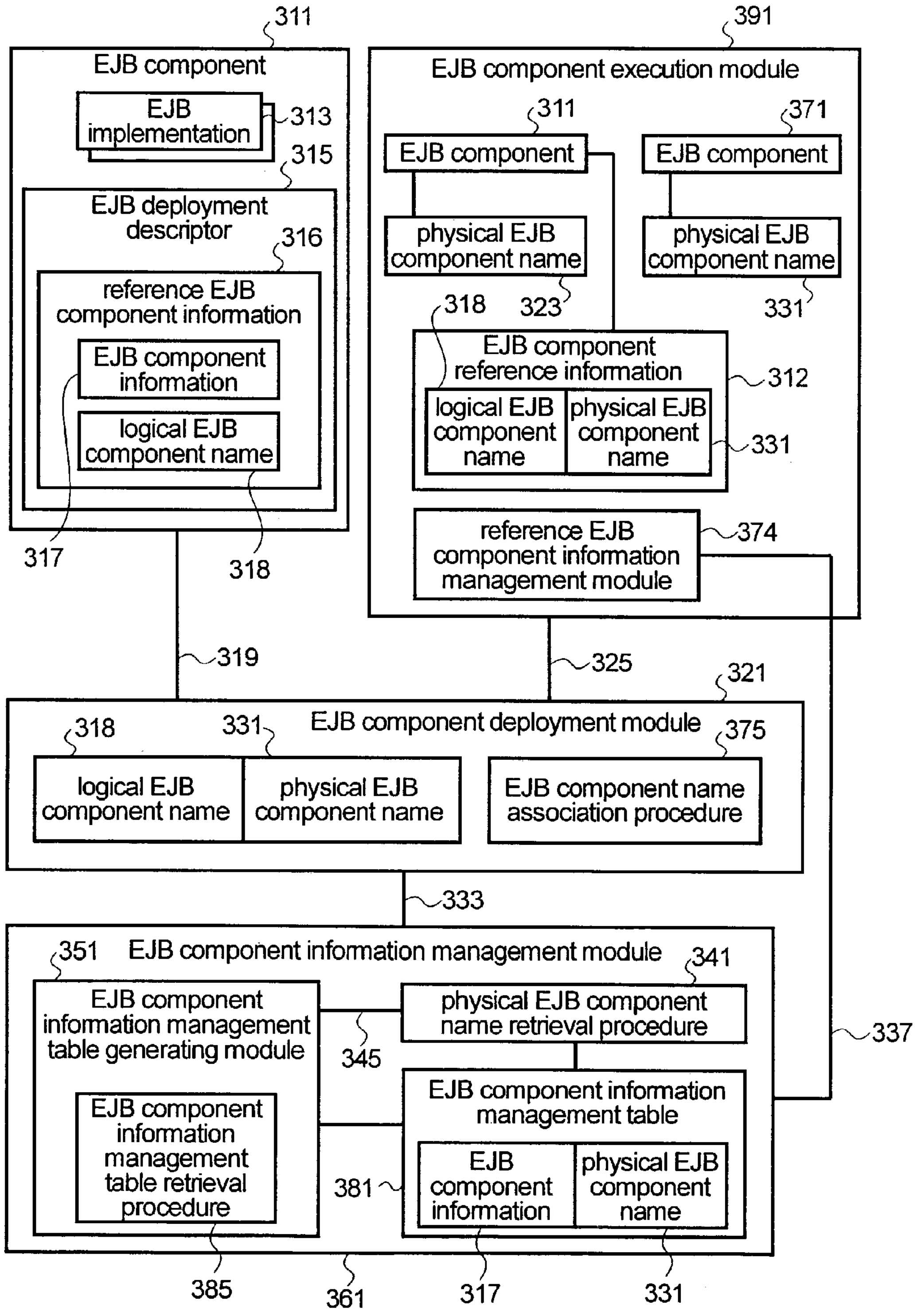
FIG. 3 illustrates a first drawing showing a name association method according to one embodiment of the present invention.

FIG. 3 is a drawing showing a name association method applied to an Enterprise JavaBeans system according to one embodiment of the present invention. An Enterprise JavaBeans (EJB) component 311 refers to an EJB component 371 and is formed from an EJB implementation 313 that is an implementation module of the EJB component and an EJB deployment descriptor 315 that is a file containing deployment information of the EJB component 311. The EJB deployment descriptor 315 includes deployment information in the form of reference EJB component information 316. The reference EJB component information 316 contains EJB component information 317 and an EJB logical component name 318 for the EJB component 371. The EJB component 371 has already been deployed in the EJB component execution module 391 and has been assigned a physical EJB component name 331.

An EJB component deployment module 321 obtains the reference EJB component information 316 from an input 319 and sends the EJB component information 317 to an EJB information management module 361 to perform an automatic search step 333. Once the EJB component information 317 is sent for the search 333, the information management module 361 uses a physical EJB component name search procedure 341 so that a table generation notification 345 is sent to instruct an EJB component information management table generating module 351 to generate an EJB component information management table 381. The EJB component information management table generating module 351 receives the notification and uses an EJB component information management table retrieval procedure 385 so that a look-up operation 337 queries a reference EJB component information management module 374 to retrieve values for the EJB component information 317 and the physical EJB component name 331.

The retrieved values for the EJB component information and the physical EJB component name 331 are used by the table generating module 351 to generate the EJB component information management table 381. Once the EJB component information management table 381 is generated, the physical EJB component name search procedure 341 uses the EJB component information 317 to search the EJB component information management table 381 for a value for the physical EJB component name 331. The EJB component deployment module 321 obtains the physical EJB component name 331 retrieved by the search operation 333 and associates this with the physical EJB component name 318 using an EJB component name association procedure 375.

In one embodiment, the information management table 381 is generated and the look-up operation 337 is performed automatically without direct human intervention. Additionally, the search of the information management table 381 for the physical EJB component name 331 is performed automatically.

A deployment operation 325 is performed by the EJB component deployment module 321 to deploy the EJB component 311 to the EJB component execution module 391. In this operation, EJB component reference information 312, containing information associating the logical EJB component name 318 with the physical EJB component name 331, and the physical EJB component name 323 is added to the EJB component 311.

Figure 4:
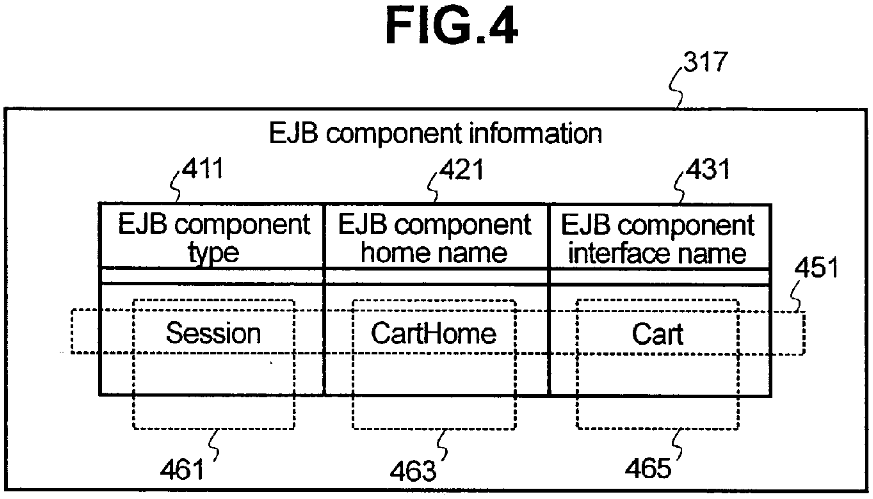
FIG. 4 illustrates a structure of EJB component information according to one embodiment of the present invention.

FIG. 4 is a drawing showing a structure of the EJB component information 317 according to one embodiment of the present invention. The EJB component information 317 includes an EJB component 411, an EJB component 421, and an EJB component interface name 431. A record 451 stores the values for the EJB component type 411, the EJB component home name 421, and the EJB component interface name 431.

Figure 5:
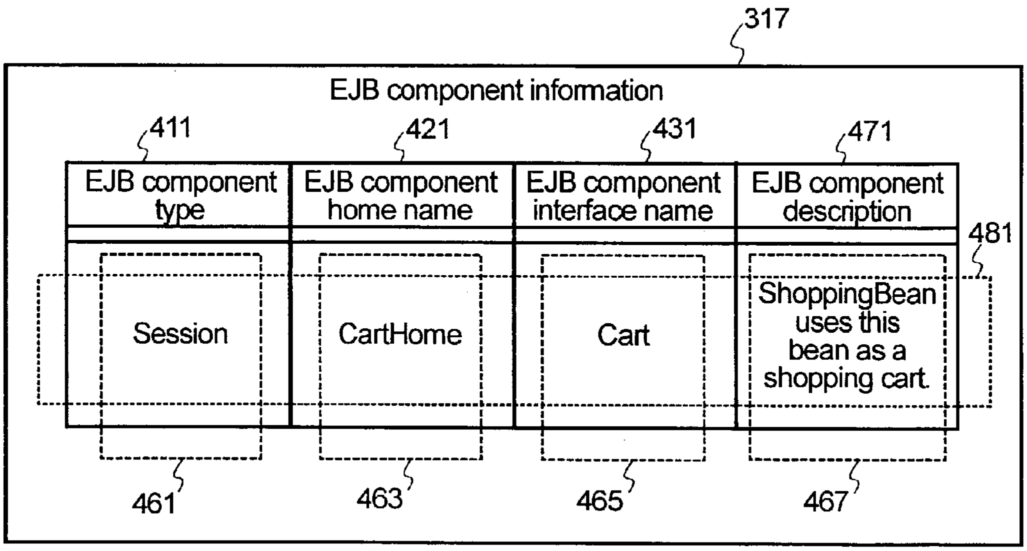
FIG. 5 illustrates a structure of EJB component information according to another embodiment of the present invention.

FIG. 5 is a drawing showing a structure of the EJB component information 317 according to another embodiment of the present invention. The EJB component information 317 includes an EJB component description 471 in addition to the EJB component type 411, the EJB component home name 421, and the EJB component interface name 431.

The EJB component description 471, which is added to the component by the creator of the EJB component, is provided to describe the EJB component to those referring to the EJB component. Also, the physical EJB component name search procedure 341 stores a value that is unique within the component execution module in the EJB component description 471 in order to uniquely identify the physical EJB component name.

A record 481 contains values for the EJB component type 411, the EJB component home name 421, the EJB component interface name 431, and the EJB component description 471 of the EJB component 371.

FIG. 6 shows the EJB deployment descriptor 315 according to one embodiment of the present invention. A value 515 of an element 511 is the value of the EJB component description 471 of the EJB component 371. This is stored as the value in the column 467. A value 525 of an element 521 is the value of the logical EJB component name 318 of the EJB component 371 and is stored as the value for the logical EJB component name 318. A value 535 of an element 531 is the value of the EJB component type 411 of the EJB component 371 and is stored as the value for the column 461. A value 545 of an element 541 is a value of the EJB component home name 421 of the EJB component 371 and is stored as the value for the column 463. A value 555 of an element 551 is the value for the EJB component interface name 431 of the EJB component 371 and is stored as the value for the column 465.

FIG. 7 shows a structure of the EJB component management table 381 according to one embodiment of the present invention. The EJB component management table 381 includes the EJB component type 411, the EJB component home name 421, the EJB component interface name 431, and the physical EJB component name 331. The values for the EJB component 371 are stored in a record 642.

FIG. 8 shows a structure of the EJB component management table 381 according to another embodiment of the present invention. The EJB component management table 381 includes the EJB component type 411, the EJB component home name 421, the EJB component interface name 431, the EJB component description 471, and the physical EJB component name 331. The table 381 of FIG. 8 includes the component description 471 unlike the table 381 of FIG. 7. The values for the EJB component 371 are stored in a record 851.

Figure 9:
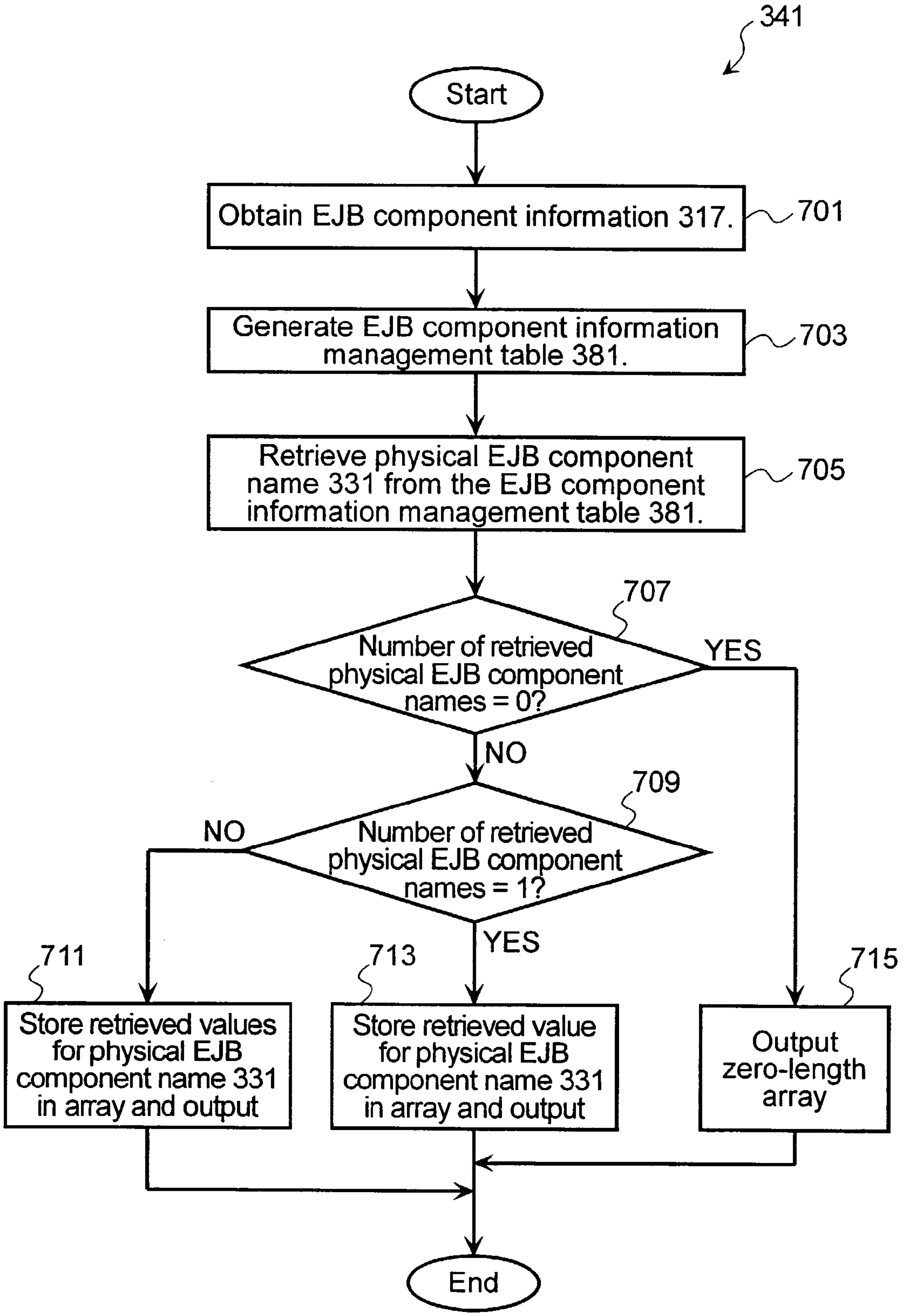
FIG. 9 illustrates a flowchart of an physical EJB component name search procedure according to one embodiment of the present invention.

FIG. 9 depicts a flowchart of the physical EJB component name search procedure 341 according to one embodiment of the present invention. The search operation 333 retrieves the EJB component information 317 of the reference component information 316 from the EJB deployment descriptor 315 (step 701).

Next, the search procedure 341 uses the EJB component information management table generating module to generate the EJB component information management table 381 (step 703). Using the retrieved EJB component information 317, the value of the corresponding physical EJB component name 331 is retrieved from the EJB component information management table 381 (step 705).

Next, the value of the retrieved physical EJB component name 331 is checked to see if it indicates 0 matches (step 707). If there is no match for the physical EJB component name 331, an array with length 0 is outputted (step 715). If at least one match is obtained, the value is checked to see if it is 1 (step 709). If there are more than one values for the physical EJB component name 331, the values are stored in a single array and outputted (step 711). If there is just one value for the physical EJB component name 331, the value of the physical EJB component name is placed in an array and output (step 713).

Figure 10:
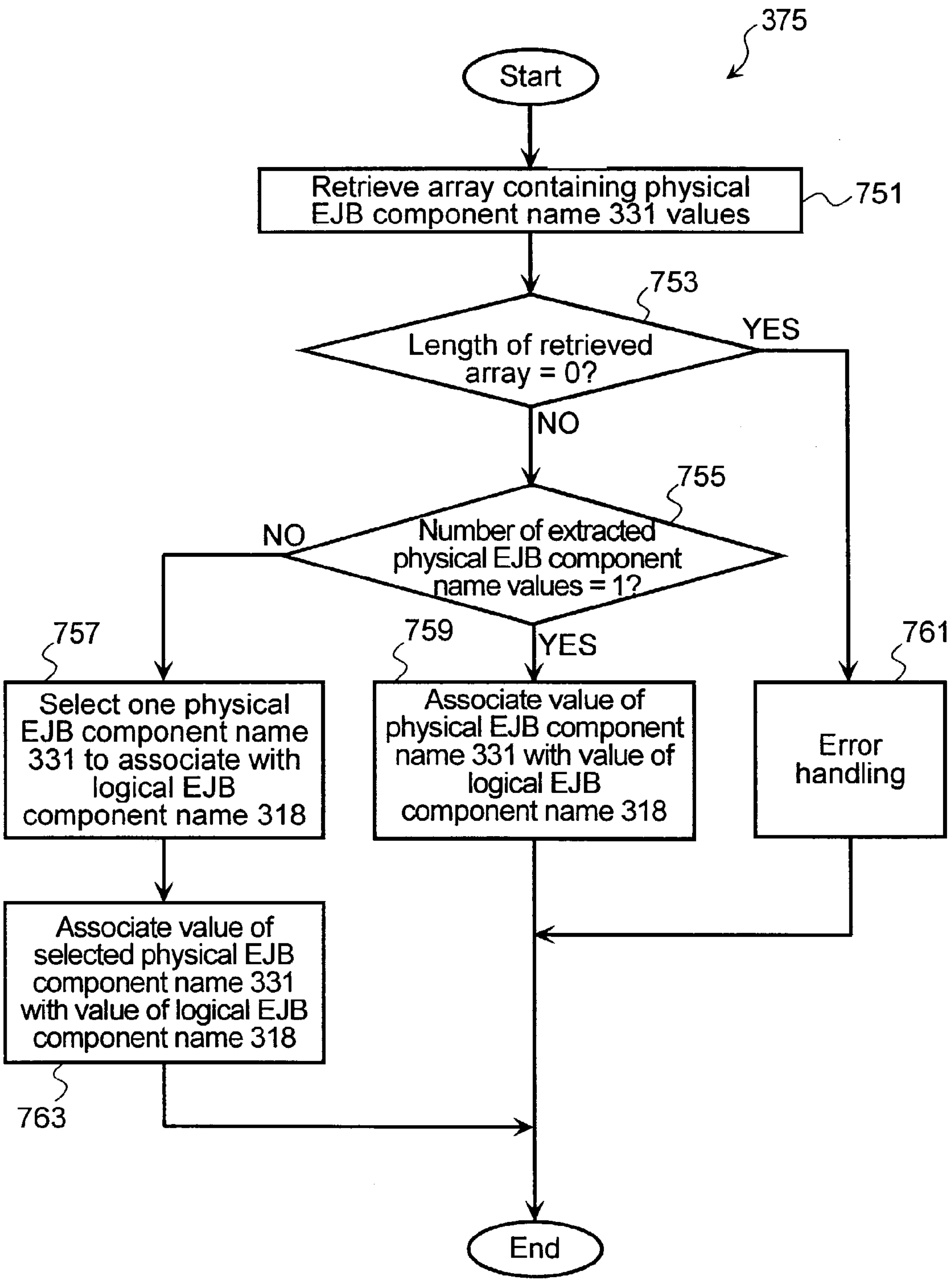
FIG. 10 illustrates a flowchart of an EJB component name association procedure according to one embodiment of the present invention.

FIG. 10 is a flowchart of the EJB component name association procedure 375 according to one embodiment of the present invention. The array that was output from the physical EJB component name search procedure 341 is retrieved by the search operation 333 (step 751). The retrieved array is checked to see if it has a length of 0 (step 753). If the array length is 0, i.e., no match has been found, an error handling step is performed (step 761). If the array length is greater than 0, i.e., at least one match has been found, the values for the physical EJB component name 331 are extracted from the array. The number of values for the physical EJB component name 331 in the array is checked to see if it is 1 (step 755). If so, the value for the physical EJB component name 331 is associated with the value for the logical component name 318 by deployment module (step 759). In one embodiment, a human deployer may review the physical and logical names that have been associated to determine the appropriateness of the association.

If more than one values for the physical EJB component name 331 exist, the component deployment module 321 automatically selects one of the values for the physical component name 331 to be associated with the value for the logical component name 318 (step 757). The value for the physical EJB component name 331 selected by the component deployment module is associated with the value for the logical EJB component name 318 (step 763). In one embodiment, a human deployer reviews the automatically selected value for its appropriateness. If the selected value is deemed inappropriate by the human deployer, another selection may be made by the human deployer directly or may initiate the component deployment module to select another value. This review procedure may be initiated by requiring the component deployment module to send an indication or alert to the human deployer when it has been determined that there are multiple values at the step 755. Such an alert may also be provided at the step 757 or 763.

Figure 11:
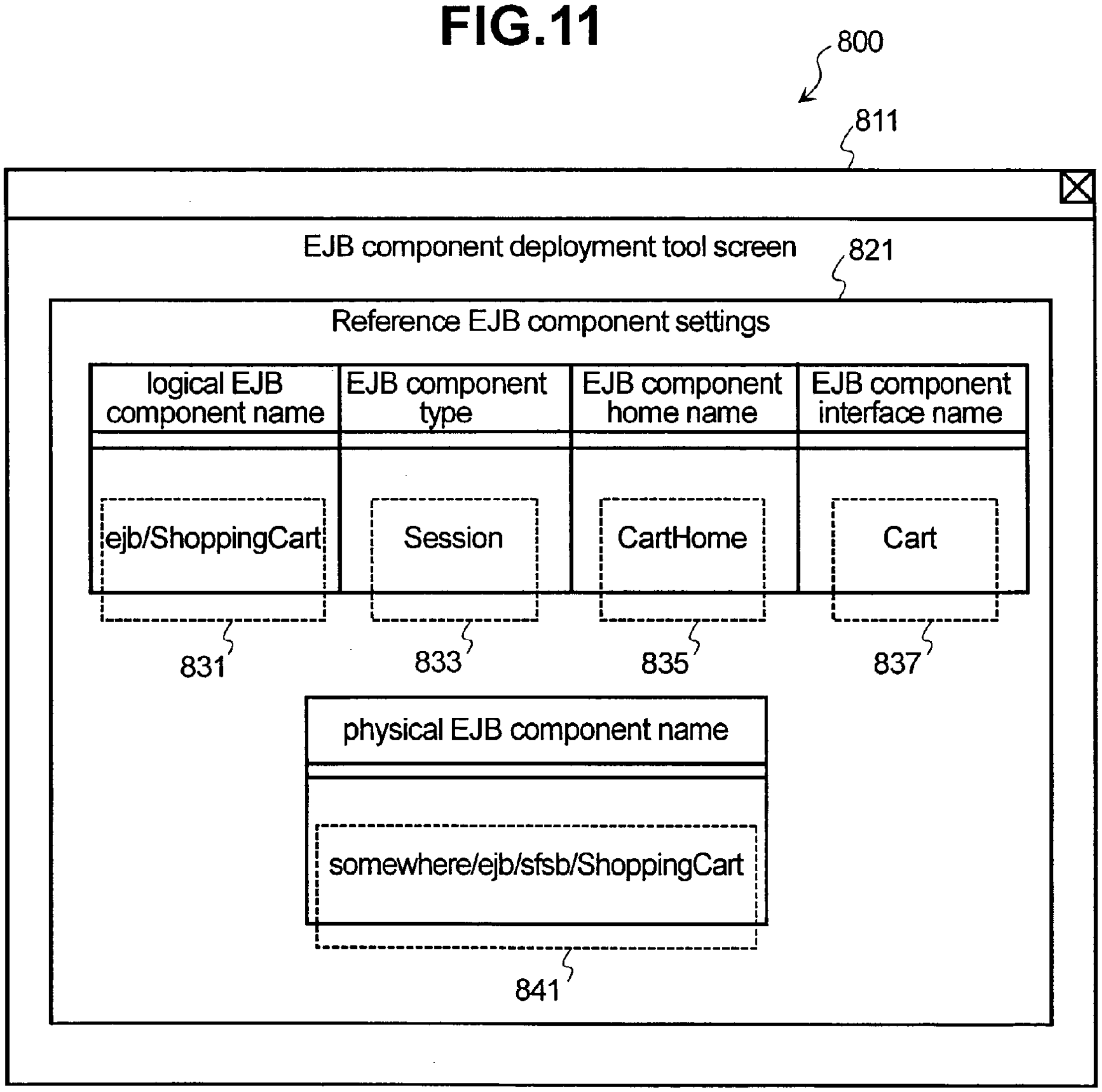
FIG. 11 illustrates a GUI provided by an EJB component deployment module according to one embodiment of the present invention.

FIG. 11 shows a graphic user interface (GUI) 800 provided by the EJB component deployment module 321 according to one embodiment of the presenting invention. Reference EJB component settings 821 of an EJB component deployment tool 811 includes a field 831, a field 833, a field 835, a field 837, and a field 841. The field 831 is associated with the logical EJB component name 318, the field 833 is associated with the EJB component type 411, the field 835 is associated with the EJB component home name 421, the field 837 is associated with the EJB component interface name 431, and the field 841 is associated with the physical EJB component name 331.

Figure 12:
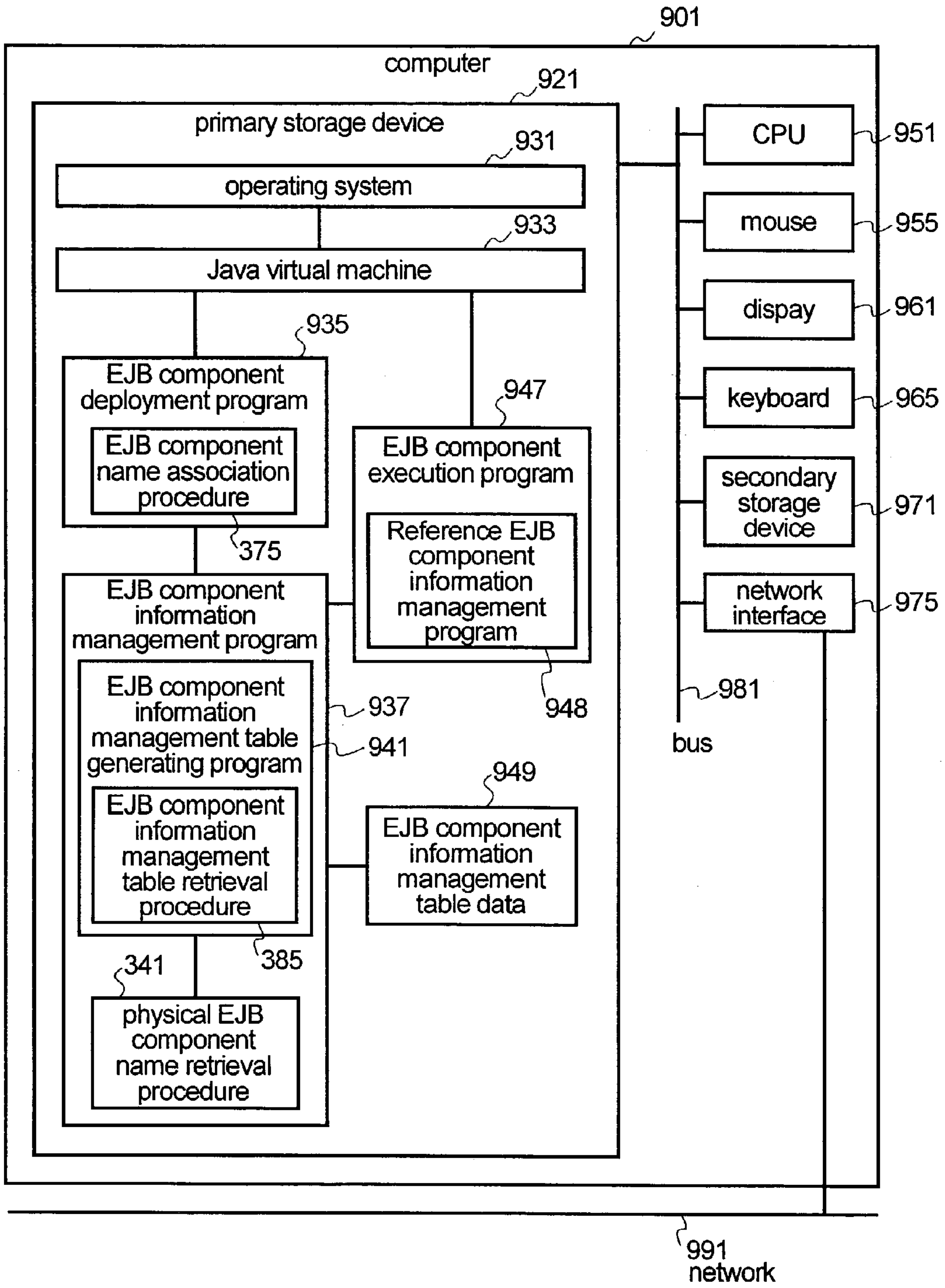
FIG. 12 illustrates a device architecture associated with FIG. 3.

FIG. 12 shows a device architecture corresponding to FIG. 3 according to one embodiment of the present invention. A computer 901 includes a primary storage device 921, a CPU 951, a mouse 955, a display 961, a keyboard 965, a secondary storage device 971, a network interface 975, and a bus 981 that connects these elements. The computer 901 is connected to a network 991 through a network interface 975.

The primary storage device 921 stores an operating system 931, a JAVA virtual machine 933, an EJB component deployment program 935, an EJB component information management program 937, an EJB component execution program 947, and EJB component information management table data 949. Alternatively, the EJB component information management table data 949 may be stored in a secondary storage device 971, a medium that can be accessed by the EJB component information management program 937, or another computer device connected to the network 991.

Figure 13:
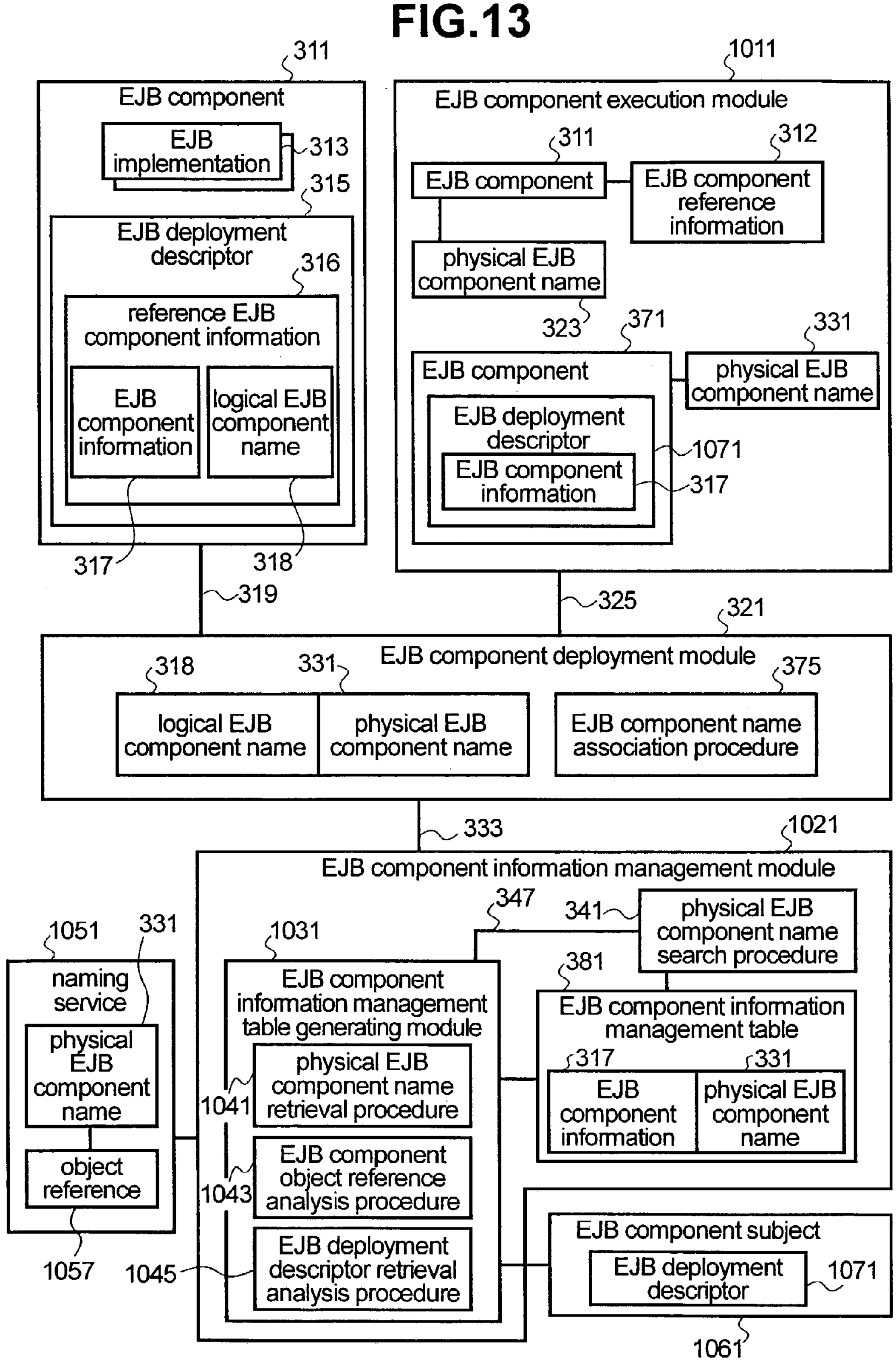
FIG. 13 illustrates a name association method according to another embodiment of the present invention.

FIG. 13 illustrates a name association method implemented for Enterprise JavaBeans (EJB) according to another embodiment of the present invention. The EJB component deployment module 321 retrieves the reference EJB component information 316 from the input 319 and sends the EJB component information 317 to the deployment module 321 for the search operation 333. When the EJB component information 317 is received from the search operation 333, an EJB component information management module 1021 uses the physical EJB component name search procedure 341 so that the table generation notification 347 instructs an EJB component information management table generating module 1031 to generate the EJB component information management table 381. The EJB component information management table generating module 1031 receives the instruction and uses the physical EJB component name retrieval procedure 1041 to retrieve a value for the physical EJB component name 331 from a naming service 1051. Next, using the retrieved value for the physical EJB component name 331 as an input, the EJB component information management table generating module 1031 uses an EJB component object reference analysis procedure 1043 to obtain a value for an object reference 1057 associated with the physical EJB component name 331 from the naming service 1051. The retrieved value for the object reference 1057 is then analyzed and the address of an EJB component subset 1061 associated with the value of the object reference 1057 is obtained. The EJB component subset 1061 is a subset needed to execute the EJB component 371 deployed to an EJB component execution module 1011 and includes an EJB deployment descriptor 1071 contained in the EJB component 371. Using the address of the retrieved EJB component subset 1061, the EJB component information management table generating module 1031 obtains the EJB component subset via an EJB deployment descriptor retrieval analysis procedure 1045 and analyzes the EJB deployment descriptor 1071 contained in the EJB component subset 1061. By analyzing the EJB deployment descriptor 1071, a value for the EJB component information 317 of the EJB component 371 deployed to the EJB component execution module 1011 is obtained.

Based on this value for the EJB component information 317 and the value of the physical EJB component name 331, the EJB component information management table generating module 1031 generates the EJB component information management table 381. After the management table 381 is generated, the physical EJB component name search procedure 341 searches for the physical EJB component name 331 from the management table 381 using the value of the EJB component information 318 obtained from the search operation 333 as the key. The EJB component deployment module 321 obtains the retrieved value for the physical EJB component name 331 via the search operation 333 and associates it with the value of the logical EJB component name 318 using the EJB component name association procedure 375.

Figure 14:
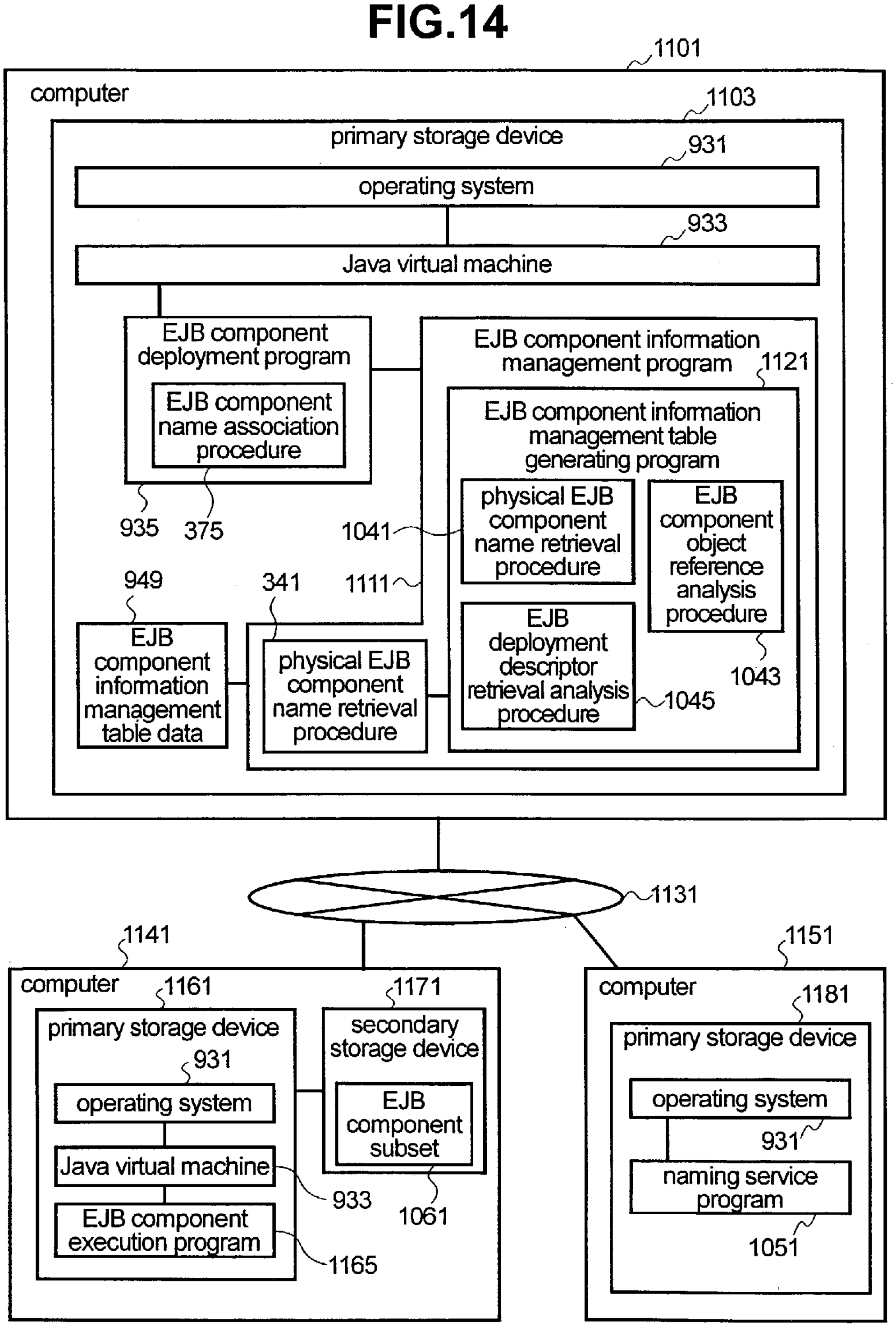
FIG. 14 illustrates a device architecture associated with FIG. 13.

FIG. 14 illustrates a device architecture corresponding to FIG. 13 according to one embodiment of the present invention. A computer 1101 is connected to a network 1131. A primary storage device 1103 of the computer 1101 stores the operating system 931, the JAVA virtual machine 933, the EJB component deployment program 935 that includes the EJB component name association procedure 375, the EJB component information management program 1111 that includes the physical EJB component name search procedure 341 and an EJB component information management table generating program 1121, and the EJB component information management table data 949. Alternatively, the EJB component information management table data 949 can be stored in a medium that can be accessed by the EJB component information management program 1111 or another computer device connected to the network 1131.

A computer 1141 is connected to the network 1131. A primary storage device 1161 of the computer 1141 stores the operating system 931, the Java virtual machine 933, and an EJB component execution program 1165. A secondary storage device 1171 stores the EJB component subset 1061. The EJB component subset 1061 can also be stored in another device of the computer 1141 that can be accessed by the EJB deployment descriptor retrieval analysis procedure 1045 or another computer device connected to the network 1131. A computer 1151 is connected to the network 1131. A primary storage device 1181 of the computer 1151 stores the operating system 931 and the naming service program 1051.

Figure 15:
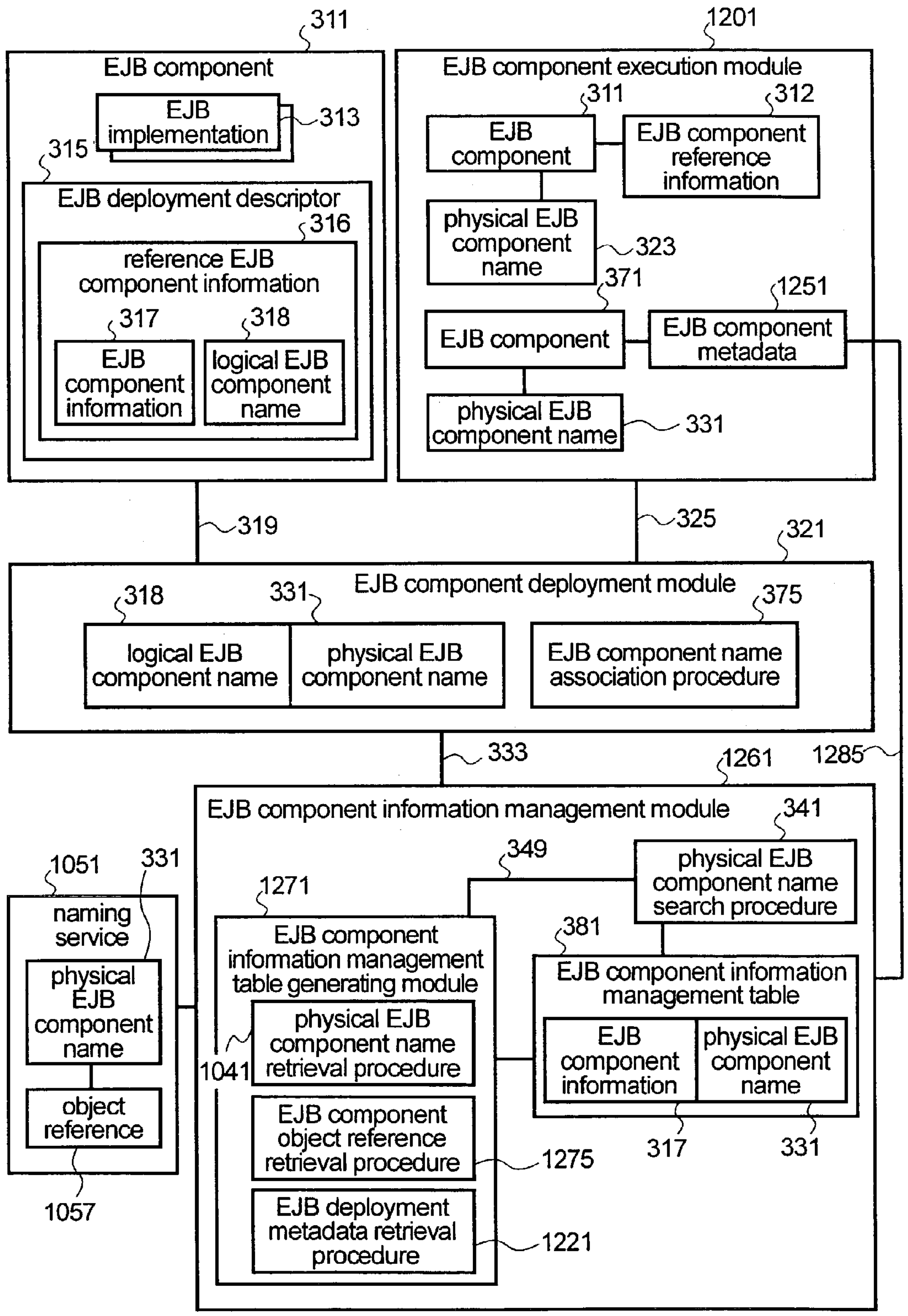
FIG. 15 illustrates a name association method according to yet another embodiment of the present invention.

FIG. 15 illustrates a name association method implemented for Enterprise JavaBeans according to another embodiment of the present invention. The component metadata shown here is added to EJB components deployed to the EJB component execution module and are used to obtain EJB component information of the EJB component to which the EJB component metadata is attached.

The EJB component deployment module 321 obtains the reference EJB component information 316 from the input 319 and sends the content of the EJB component information 317 to the deployment module 321 for the search operation 333.

After the search operation 333 receives the content of the EJB component information 317, the EJB component information management module 1261 uses the physical EJB component name search procedure 341 so that the table generation notification 349 instructs the EJB component information management table generating module 1271 generates the EJB component information management table 381. The table generating module 1271 receives the notification and uses the physical EJB component name retrieval procedure 1041 to obtain a value for the physical EJB component name 331 from the naming service 1051. Next, the obtained value for the physical EJB component name 331 is used as the input by the EJB component information management table generating module 1271, which uses an EJB component object reference retrieval procedure 1275 to obtain a value for the object reference 1057 associated with the physical EJB component name 331 from the naming service 1051. Then, the table generating module 1271 uses an EJB component metadata retrieval procedure 1221 to obtain the EJB component metadata 1251 from a look-up operation 1285, with the retrieved value of the object reference 1057 serving as the input source. Then, the content of the EJB component information 317 associated with the EJB component 371 is retrieved from the EJB component metadata 1251.

Based on the retrieved content of the EJB component information 317 and the physical EJB component name 331, the table generating module 1271 generates the EJB component information management table 381.

After the EJB component information management table 381 is generated, the physical EJB component name search procedure 341 retrieves content for the physical EJB component name 331 from the EJB component information management table 381 based on the EJB component information 318 obtained from the search operation 333. The EJB component deployment module 321 passes the retrieved content of the physical EJB component name 331 to the search operation 333 and, using the EJB component name association procedure 375, associates it with the content of the logical EJB component name 318.

Figure 16:
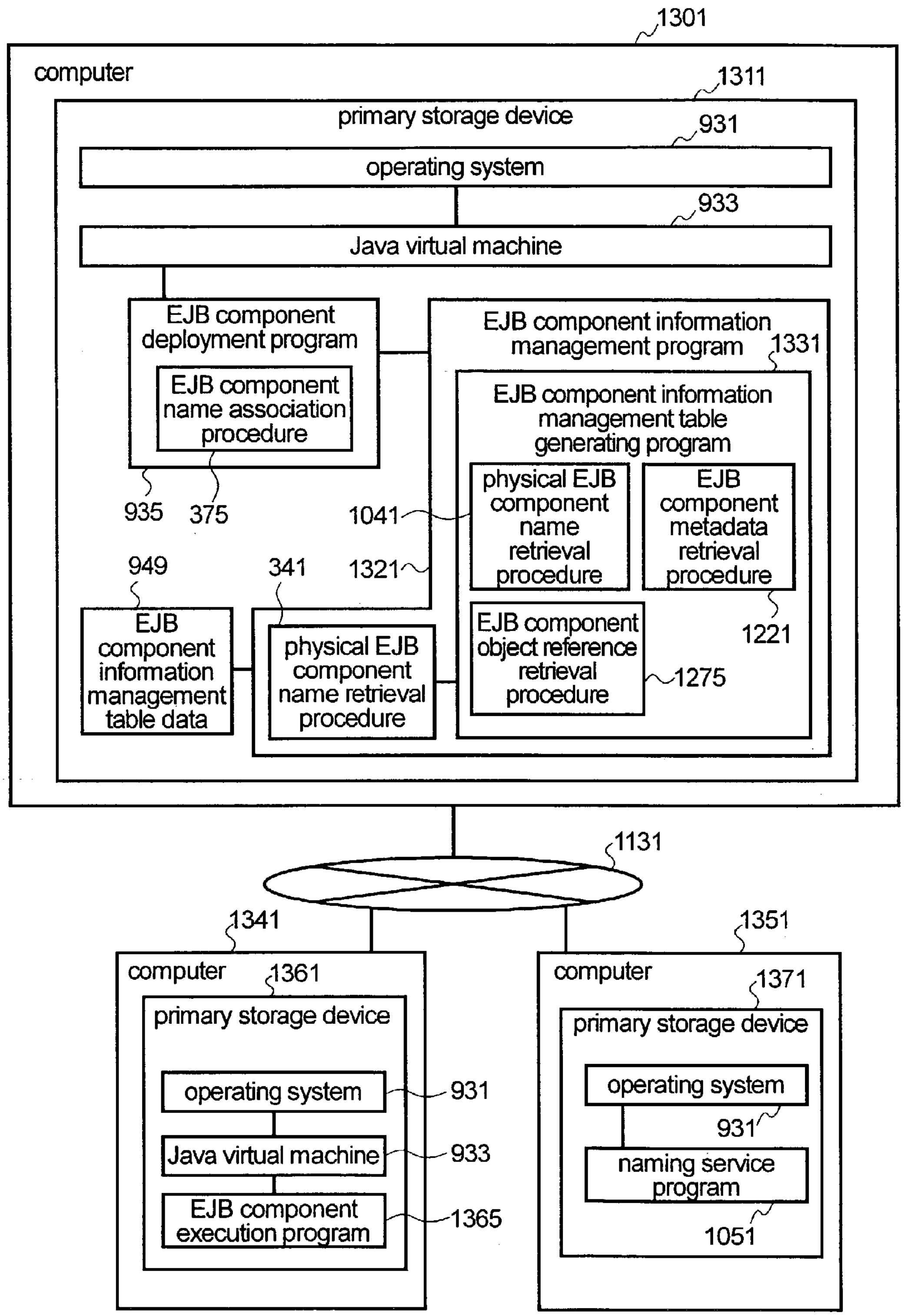
FIG. 16 illustrates an example of a device architecture associated with FIG. 15.

FIG. 16 shows a device architecture of FIG. 15 according to one embodiment of the present invention. A computer 1301 is connected to the network 1131. A primary storage device 1311 of the computer 1301 includes: the operating system 931; the Java virtual machine 933; the EJB component deployment program 935, which includes the EJB component name association procedure 375; an EJB component information management program 1321, which includes the physical EJB component name search procedure 341 and an EJB component information management table generating program 1331; and the EJB component information management table data 949. The EJB component information management table data 949 can also be stored in another device that can be accessed by the physical EJB component name search procedure 341 or another computer connected to the network 1131.

A computer 1341 is connected to the network 1131. A primary storage device 1361 of the computer 1341 stores the operating system 931, the Java virtual machine 933, and an EJB component execution program 1365.

A computer 1351 is connected to the network 1131. A primary storage device 1371 of the computer 1351 stores the operating system 931 and the naming service program 1051.

The above detailed descriptions are provided to illustrate specific embodiments of the present invention and are not intended to be limiting. Numerous modifications and variations within the scope of the present invention are possible. Accordingly, the present invention is defined by the appended claims.

What is claimed is:

1. A computer-implemented method of associating components between a first component and a second component in an object-oriented environment which is compatible with JAVA code, wherein the first component refers to the second component deployed in a component execution module, said first component holding a first deployment descriptor including a reference component information having a component logical name, an exterior interface, and a type of said second component, and said second component holding a second deployment descriptor including a component information having said exterior interface and said type of said second component, the method comprising:

generating a component information management table, the component information management table including said component information and a physical component name of the second component as a list format;

retrieving the physical component name of the second component from the component information management table using the reference component information stored in the first component; and associating the physical component name of the second component obtained from the retrieving step with a logical component name stored in the first component.

2. The method of claim 1, further comprising obtaining the component information and the physical component name of the second component from the component execution module to generate said component information management table.

3. The method of claim 2, wherein said first component holds said first deployment descriptor including said component logical name, said exterior interface, said type, and a component description of unique value in said second component, and said second component holds said exterior interface, said type, and the component description.

4. The method of claim 2, wherein the physical component name of the second component is retrieved using the component information stored in the first component and a plurality of physical component names are retrieved by the retrieving step.

5. The method of claim 1, wherein the physical component name of the second component is obtained from a naming service, the method further comprising:

obtaining an object reference associated with the physical component name from the naming service;

using the object reference to obtain a component meta data including said component information from the second component; and generating said component information management table holding the component information and physical component name of the second component as a list format.

6. A computer-implemented method of deploying a first component in an object-oriented environment which is compatible with JAVA code, wherein the first component refers to the second component deployed in a component execution module, said first component holding a first deployment descriptor including a reference component information having a component logical name, an exterior interface, and a type of said second component, and said second component holding a second deployment descriptor including a component information having said exterior interface and said type of said second component, the method comprising;

generating a component information management table, the component information management table including said component information and a physical component name of the second component as a list format;

retrieving the physical component name of the second component from the component information management table using the reference component information stored in the first component; and associating the physical component name of the second component obtained from the retrieving step with a logical component name stored in the first component; and deploying said first component in the component execution module.

7. The method of claim 6, further comprising obtaining the component information and the physical component name of the second component from the component execution module to generate said component information management table.

8. The method of claim 6, wherein said first component holds said first deployment descriptor including said component logical name, said exterior interface, said type, and a component description of unique value in said second component, and said second component holds said exterior interface, said type, and the component description.

9. The method of claim 6, wherein the physical component name of the second component is retrieved using the component information stored in the first component and a plurality of physical component names are retrieved by the retrieving step.

10. The method of claim 9, wherein the physical component name of the second component is obtained from a naming service, the method further comprising:

obtaining an object reference associated with the physical component name from the naming service;

using the object reference to obtain a component meta data including said component information from the second component; and generating said component a information management table holding the component information and physical component name of the second component as a list format.

11. A computer readable medium including instructions for associating components between a first Enterprise JAVA Bean (EJB) component and a second EJB component in an object-oriented environment which is compatible with JAVA code, wherein the first EJB component refers to the second EJB component deployed in a component execution module said first EJB component holding a first deployment descriptor including a reference component information having a component logical name, an exterior interface, and a type of said second component, and said second EJB component holding a second deployment descriptor including a component information having said exterior interface and said type of said second EJB component, the medium comprising:

code for generating a component information management table, the component information management table including said component information and a physical component name of the second EJB component as a list format;

retrieving the physical component name of the second EJB component from the component information management table using the reference component information stored in the first EJB component; and associating the physical component name of the second EJB component obtained from the retrieving step with a logical component name stored in the first EJB component.

12. A computer system configured to associating components between a first Enterprise JAVA Bean (EJB) component and a second EJB component in an object-oriented environment which is compatible with JAVA code, wherein the first EJB component refers to the second EJB component deployed in a component execution module, said first EJB component holding a first deployment descriptor including a reference component information having a component logical name, an exterior interface, and a type of said second component, and said second EJB component holding a second deployment descriptor including a component information having said exterior interface and said type of said second EJB component, the computer system including a computer storage medium comprising:

code for generating a component information management table, the component information management table including said component information and a physical component name of the second EJB component as a list format;

retrieving the physical component name of the second EJB component from the component information management table using the reference component information stored in the first EJB component; and associating the physical component name of the second EJB component obtained from the retrieving step with a logical component name stored in the first EJB component.

13. A device for associating components between a first Enterprise JAVA Bean (EJB) component and a second EJB component in an object-oriented environment which is compatible with JAVA programming environment, wherein the first EJB component refers to the second EJB component deployed in a component execution module, said first EJB component holding a first deployment descriptor including a reference component information having a component logical name, an exterior interface, and a type of said second component, and said second EJB component holding a second deployment descriptor including a component information having said exterior interface and said type of said second EJB component, the device including a computer storage medium comprising:

code for generating a component information management table, the component information management table including said component information and a physical component name of the second EJB component as a list format;

retrieving the physical component name of the second EJB component from the component information management table using the reference component information stored in the first EJB component; and associating the physical component name of the second EJB component obtained from the retrieving step with a logical component name stored in the first EJB component.

* * * * *